US012668224B2

(12) United States Patent
Ohira et al.

(10) Patent No.: US 12,668,224 B2
(45) Date of Patent: Jun. 30, 2026

(54) VEHICLE BRAKE SYSTEM

(71) Applicant: HONDA MOTOR CO., LTD., Tokyo (JP)

(72) Inventors: Atsuki Ohira, Tokyo (JP); Eisuke Horii, Tokyo (JP); Hiroyuki Iwasaki, Tokyo (JP); Masayuki Ueno, Tokyo (JP); Shotaro Yamazaki, Tokyo (JP); Takashi Shimada, Tokyo (JP); Tomoaki Kotaki, Tokyo (JP); Yohei Sato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 439 days.

(21) Appl. No.: 18/470,957

(22) Filed: Sep. 20, 2023

(65) Prior Publication Data

US 2024/0101093 A1     Mar. 28, 2024

(30) Foreign Application Priority Data

Sep. 23, 2022     (JP) ................................. 2022-152025

(51) Int. Cl.
*B60T 13/66* (2006.01)
*B60T 8/40* (2006.01)
(52) U.S. Cl.
CPC .......... *B60T 13/662* (2013.01); *B60T 8/4081* (2013.01); *B60T 2270/402* (2013.01); *B60T 2270/404* (2013.01)
(58) Field of Classification Search
CPC ................. B60T 13/662; B60T 8/4081; B60T 2270/402; B60T 2270/404
(Continued)

(56) References Cited

U.S. PATENT DOCUMENTS 8,838,355 B2 * 9/2014 Ito ......................... B60T 8/4018
                                                   701/73
9,499,151 B2 * 11/2016 Shimada ............... B60T 13/146
(Continued)

FOREIGN PATENT DOCUMENTS

CN          113830058 A     12/2021
DE      102019123343 A1     3/2021
(Continued)

OTHER PUBLICATIONS

Notice of Reasons for Refusal for Japanese Patent Application No. 2022-152025, dated Jun. 3, 2025; 9 pp.

*Primary Examiner* — Christopher P Schwartz
(74) *Attorney, Agent, or Firm* — Armstrong Teasdale LLP

(57) ABSTRACT

A vehicle brake system includes a switching valve switchable between a first state allowing communication between a first fluid pressure generating device and a frictional brake and a second state allowing communication between a second fluid pressure generating device and the frictional brake. The second fluid pressure generating device generates a fluid pressure by moving a piston with an electric actuator, and has a fluid pressure supply port connected to the switching valve and an atmosphere opening port connected to a reservoir tank. When, due to a failure, the switching valve becomes a third state in which the switching valve makes each of the first fluid pressure generating device and the second fluid pressure generating device communicate with the frictional brake, a control device controls the second fluid pressure generating device to close the atmosphere opening port with the piston.

5 Claims, 7 Drawing Sheets

(58) Field of Classification Search
USPC ........................................ 303/122.09, 122.13
See application file for complete search history.

(56) References Cited

U.S. PATENT DOCUMENTS

| | | | |
|---|---|---|---|
| 10,017,168 B2 | 7/2018 | Aoki | |
| 10,106,138 B2 | 10/2018 | Aoki | |
| 2012/0193975 A1* | 8/2012 | Ishii ...................... | B60T 8/4081 |
| | | | 303/14 |
| 2015/0061854 A1 | 3/2015 | Drumm et al. | |
| 2021/0394729 A1* | 12/2021 | Seol ................... | B60T 8/17616 |
| 2022/0289161 A1 | 9/2022 | Leiber | |
| 2024/0075915 A1* | 3/2024 | Horii ................... | B60T 13/662 |

FOREIGN PATENT DOCUMENTS

| | | | |
|---|---|---|---|
| JP | 2015013526 A | 1/2015 | |
| JP | 2016147644 A | 8/2016 | |

* cited by examiner

Fig.6 start

Figure 6:
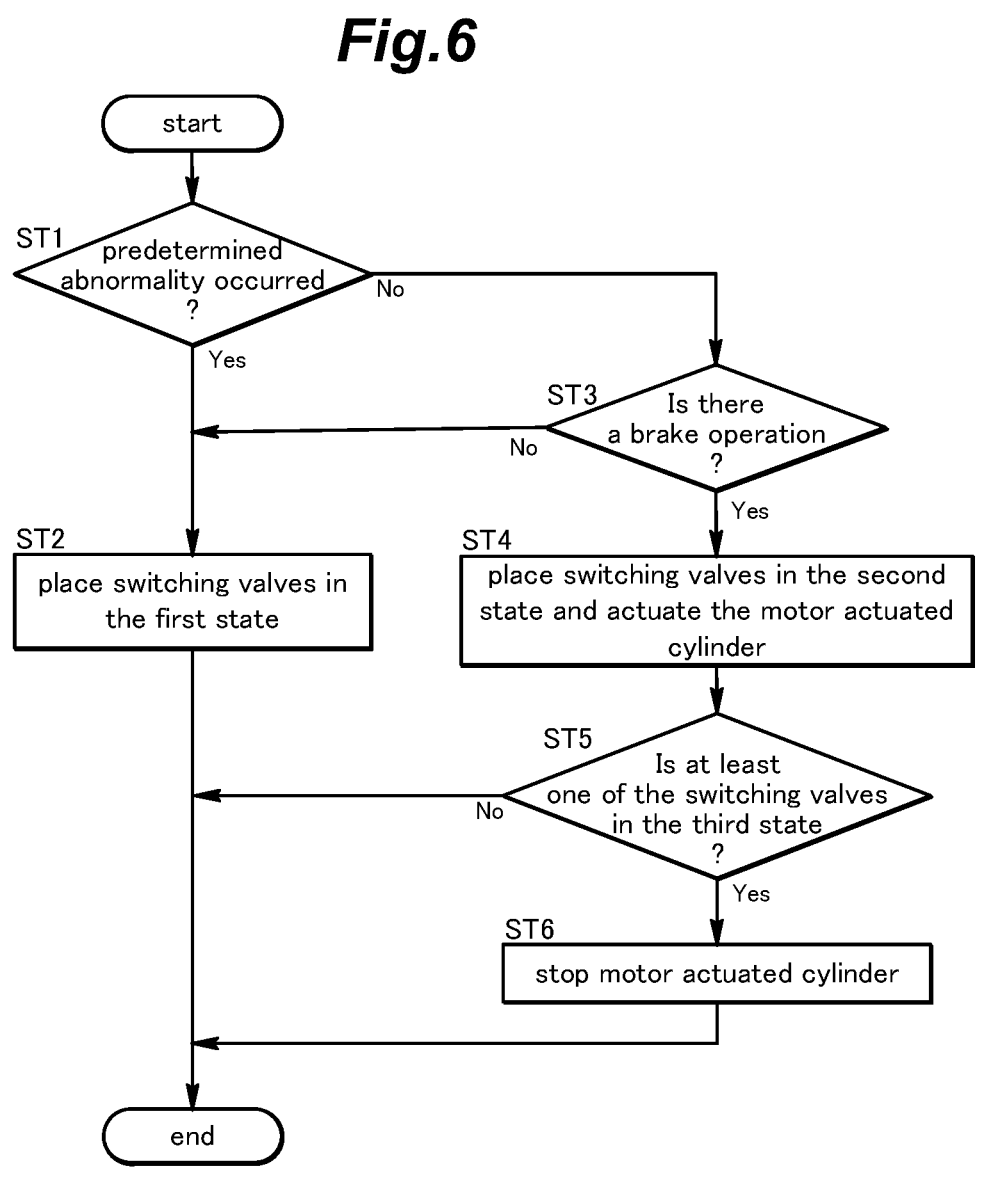

ST1  predetermined abnormality occurred ?

No

Yes

ST3  Is there a brake operation ?

No

Yes

ST2  place switching valves in the first state

ST4  place switching valves in the second state and actuate the motor actuated cylinder ST5  Is at least one of the switching valves in the third state ?

No

Yes

ST6  stop motor actuated cylinder end

Fig.7

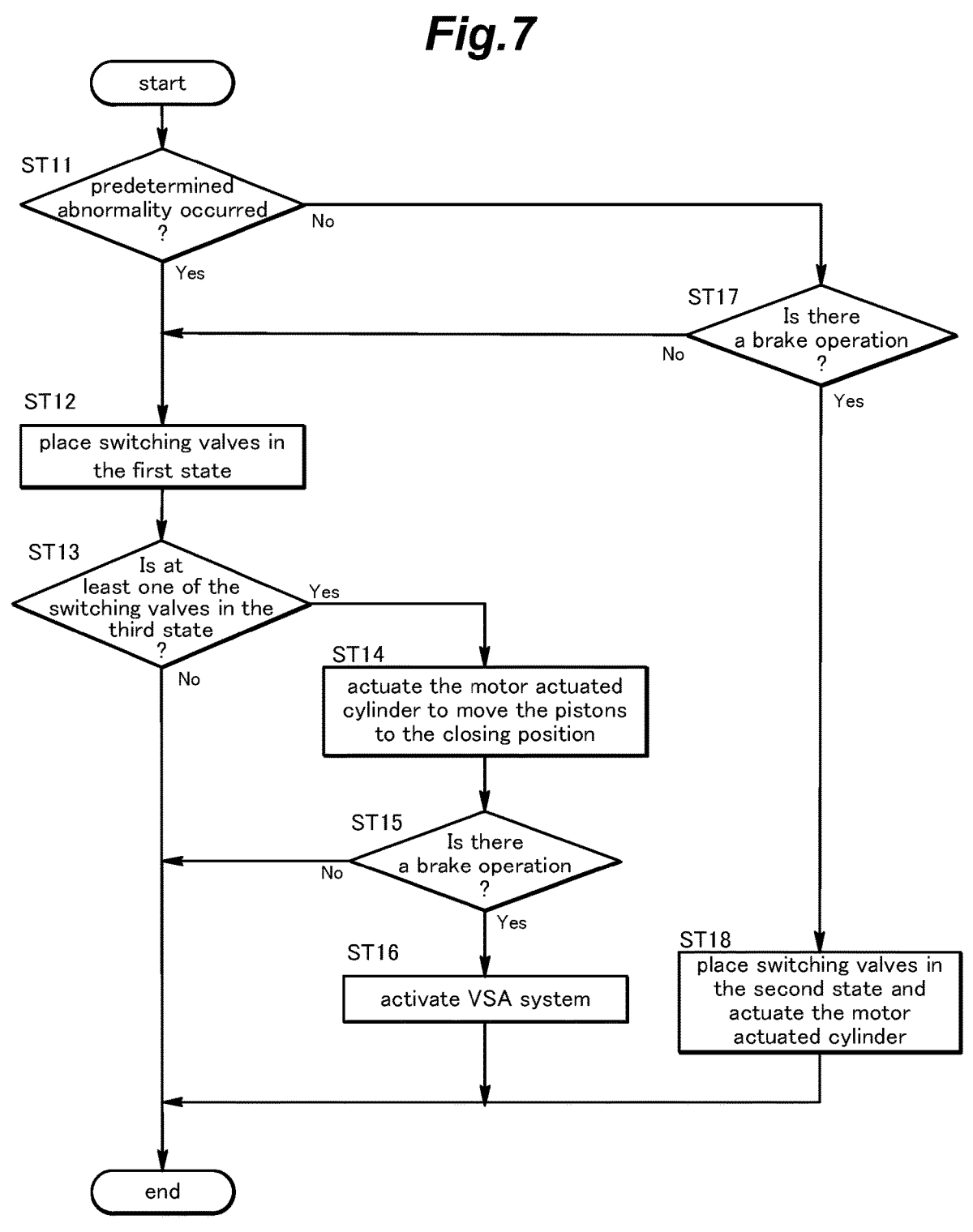

```
                        ( start )
                            │
                            ▼
ST11              ╱ predetermined ╲
              ╱   abnormality occurred ╲──────No──────────────────────┐
                ╲        ?          ╱                                  │
                    ╲          ╱                                       │
                        │Yes                                          ▼
                        │                            ST17      ╱ Is there ╲
                        │      ┌────────No───────────╲ a brake operation ╱
                        │      │                         ╲      ?       ╱
                        │      │                             ╲      ╱
                        ▼      ▼                                 │Yes
ST12   ┌──────────────────────────┐                             │
       │ place switching valves in │                            │
       │      the first state      │                            │
       └──────────────────────────┘                             │
                        │                                        │
                        ▼                                        │
ST13         ╱    Is at    ╲                                     │
         ╱   least one of the  ╲────Yes────┐                     │
        ╲ switching valves in the ╱         │                    │
          ╲    third state   ╱              │                    │
              ╲    ?    ╱                   ▼                     │
                  │No        ST14  ┌──────────────────────┐      │
                  │                │ actuate the motor actuated │  │
                  │                │ cylinder to move the pistons│ │
                  │                │   to the closing position  │ │
                  │                └──────────────────────┘      │
                  │                            │                 │
                  │                            ▼                 │
                  │            ST15     ╱ Is there ╲             │
                  │        ┌──No───────╲ a brake operation ╱     │
                  │        │              ╲     ?      ╱          │
                  │        │                  ╲   ╱               │
                  │        │                   │Yes              │
                  │        │      ST16          ▼                │
                  │        │         ┌────────────────────┐  ST18│
                  │        │         │ activate VSA system │ ┌──────────────────┐
                  │        │         └────────────────────┘ │ place switching valves in │
                  │        │                   │            │  the second state and    │
                  │        │                   │            │   actuate the motor      │
                  │        │                   │            │   actuated cylinder      │
                  │        │                   │            └──────────────────┘
                  │        │                   │                 │
                  │        └───────────────────┼─────────────────┘
                  │                            │
                  ▼                            ▼
              ( end )
```

VEHICLE BRAKE SYSTEM

TECHNICAL FIELD

The present disclosure relates to a vehicle brake system.

BACKGROUND ART

As a vehicle brake system, there is known a brake system that includes a master cylinder and a slave cylinder and has the functions of both a brake-by-wire type brake system and a hydraulic brake system (see JP2016-147644A). This brake system is provided with a switching valve for switching the connection state of the oil passages to switch the supply source of the hydraulic oil supplied to the wheel brakes between the master cylinder and the slave cylinder. A three-way valve is used as the switching valve, whereby the oil passages of the brake system are shortened and the overall size of the brake system is reduced. This brake system is further provided with a fluid pressure control unit (vehicle behavior stabilizing device) for controlling fluid pressures applied to the wheel brakes (frictional brakes) to support the stabilization of the vehicle. The vehicle behavior stabilizing device is disposed between the switching valve and the wheel brakes.

The slave cylinder is provided with an oil replenishment port (atmosphere opening port) which is connected to the oil chamber so that the hydraulic oil is supplied to the slave cylinder from the reservoir tank when the slave cylinder is not actuated, namely, when the piston is in the initial position and does not generate a fluid pressure. Incidentally, the switching valve may become unable to be actuated due to a failure in a state in which the switching valve place both of the master cylinder and the slave cylinder in communication with the wheel brakes (a state in which the switching valve is open to the both oil passages). When the slave cylinder is not actuated, the atmosphere opening port of the slave cylinder is in communication with the switching valve, and therefore, in the event of such a failure, the oil may flow out to the reservoir tank through the atmosphere opening port. As a result, even if the master cylinder is actuated to generate a fluid pressure, the fluid pressure does not increase. Also, if the aforementioned failure occurs in the switching valve while the master cylinder generates a fluid pressure, the fluid pressure decreases. As a result, the brake system becomes unable to supply the fluid pressure to the wheel cylinders, whereby the brake force cannot be generated.

Since the brake system of JP2016-147644A is provided with a cutoff valve in the oil passage between the switching valve and the slave cylinder, in the event of a failure of the switching valve, it is possible to prevent the hydraulic pressure from leaking from the slave cylinder by closing the cutoff valve. However, in the configuration of the brake system of JP2016-147644A, the number of components is large, which leads to a high cost.

In view of such problems of the prior art, a primary object of the present invention is to provide a vehicle brake system having a simple configuration and capable of generating a brake fluid pressure in the event of a failure of the switching valve.

By achieving such an object, the present invention improves the safety of vehicles, thereby contributing to further improvement of traffic safety and development of sustainable transportation systems.

Means to Accomplish the Task

To achieve the above object, one aspect of the present invention provides a vehicle brake system (1), comprising:

a first fluid pressure generating device (15) configured to generate a fluid pressure according to a brake operating amount (PS), which is an amount of operation of a brake operation member (10) by a driver; a second fluid pressure generating device (13) configured to generate a fluid pressure by moving a piston (21a, 21b) with an electric actuator (12); a frictional brake (7) provided for each wheel (2) and actuated by the fluid pressure; a switching valve (24a, 24b) configured to switch fluid passages (16) such that the frictional brake is functionally connected to one of the first fluid pressure generating device and the second fluid pressure generating device; and a control device (11) configured to control the second fluid pressure generating device and the switching valve, wherein the switching valve is configured to be switchable between a first state in which the switching valve makes the first fluid pressure generating device and the frictional brake communicate with each other and prevents a flow of fluid from the frictional brake to the second fluid pressure generating device and a second state in which the switching valve prevents a flow of fluid from the frictional brake to the first fluid pressure generating device and makes the second fluid pressure generating device and the frictional brake communicate with each other, the second fluid pressure generating device has a fluid pressure supply port (23e, 230) connected to the switching valve and an atmosphere opening port (23c, 23d) connected to a reservoir tank (20), and when, due to a failure, the switching valve becomes a third state in which the switching valve makes each of the first fluid pressure generating device and the second fluid pressure generating device communicate with the frictional brake (ST5: Yes, ST13: Yes), the control device controls the second fluid pressure generating device to close the atmosphere opening port with the piston (ST6, ST14).

According to this aspect, when, due to a failure, the switching valve becomes the third state in which the switching valve makes each of the first fluid pressure generating device and the second fluid pressure generating device communicate with the frictional brake, the atmosphere opening port of the second fluid pressure generating device, which is connected to the reservoir tank, is closed by the piston. Thereby, the fluid chamber of the second fluid pressure generating device is prevented from becoming open to the atmosphere. Therefore, it is possible to generate a brake fluid pressure supplied to the frictional brake in the event of a failure of the switching valve while simplifying the configuration of the vehicle brake system by making the conventional cutoff valve unnecessary.

Preferably, the vehicle brake system further comprises a pressure sensor (25b) disposed in the fluid passage between the switching valve and the first fluid pressure generating device or the second fluid pressure generating device, wherein the control device determines whether the switching valve has become the third state based on a stroke amount of the piston and a detection value of the pressure sensor, and when it is determined that the switching valve has become the third state (ST5: Yes), the control device controls the second fluid pressure generating device to close the atmosphere opening port with the piston (ST6).

According to this aspect, it is possible to determine that a failure of the switching valve has occurred and the switching valve has become the third state based on the stroke amount of the piston and the detection value of the pressure sensor and thereby to quickly perform fail-safe control in the event of a failure of the switching valve.

Preferably, when it is determined that the switching valve has become the third state (ST5: Yes), the control device stops the piston at a position when it is determined that the switching valve has become the third state (ST6).

According to this aspect, by stopping the piston at the position when it is determined that the switching valve has become the third state, it is possible to maintain the second fluid pressure generating device in a state in which the hydraulic fluid does not flow out to the reservoir tank from through the atmosphere opening port (a state in which the atmosphere opening port is closed). Therefore, the second fluid pressure generating device is prevented from becoming open to the atmosphere.

Preferably, when it is determined that the switching valve has become the third state (ST13: Yes), the control device controls the second fluid pressure generating device to move the piston to a position where the piston closes the atmosphere opening port (ST14).

According to this aspect, even if the atmosphere opening port of the second fluid pressure generating device is in communication with the switching valve when the switching valve becomes the third state due to a failure, the piston is displaced to the position where the piston closes the atmosphere opening port. Therefore, it is possible to prevent the second fluid pressure generating device from becoming open to the atmosphere without need for a conventional cutoff valve, whereby the vehicle brake system can be simplified in structure.

Preferably, the vehicle brake system further comprises a vehicle behavior stabilizing device (26) provided in the fluid passage between the switching valve and the frictional brake, vehicle behavior stabilizing device being configured to adjust the fluid pressure of a hydraulic fluid supplied from the first fluid pressure generating device or the second fluid pressure generating device and to apply an adjusted fluid pressure to the frictional brake, wherein when the switching valve becomes the third state (ST13: Yes), the control device activates the vehicle behavior stabilizing device to apply a fluid pressure according to the brake operating amount to the frictional brake (ST16).

According to this aspect, even when the switching valve becomes the third state due to a failure, it is possible to avoid a state in which both of the second fluid pressure generating device and the vehicle behavior stabilizing device generate the brake force (double boost), while the vehicle behavior stabilizing device generates the brake force for each wheel. Therefore, it is possible to ensure safety of the vehicle due to braking control.

Thus, according to the above arrangements, it is possible to provide a vehicle brake system having a simple configuration and capable of generating a brake fluid pressure in the event of a failure of the switching valve, whereby the present invention can improve the safety of vehicles, thereby contributing to further improvement of traffic safety and development of sustainable transportation systems.

BRIEF DESCRIPTION OF THE DRAWINGS

FIG. 6 is a flowchart of the braking control performed by the control device according to the first embodiment; and FIG. 7 is a flowchart of the braking control performed by the control device according to the second embodiment.

DETAILED DESCRIPTION OF THE INVENTION

In the following, embodiments of the present invention will be described in detail with reference to the drawings.

Figure 1:
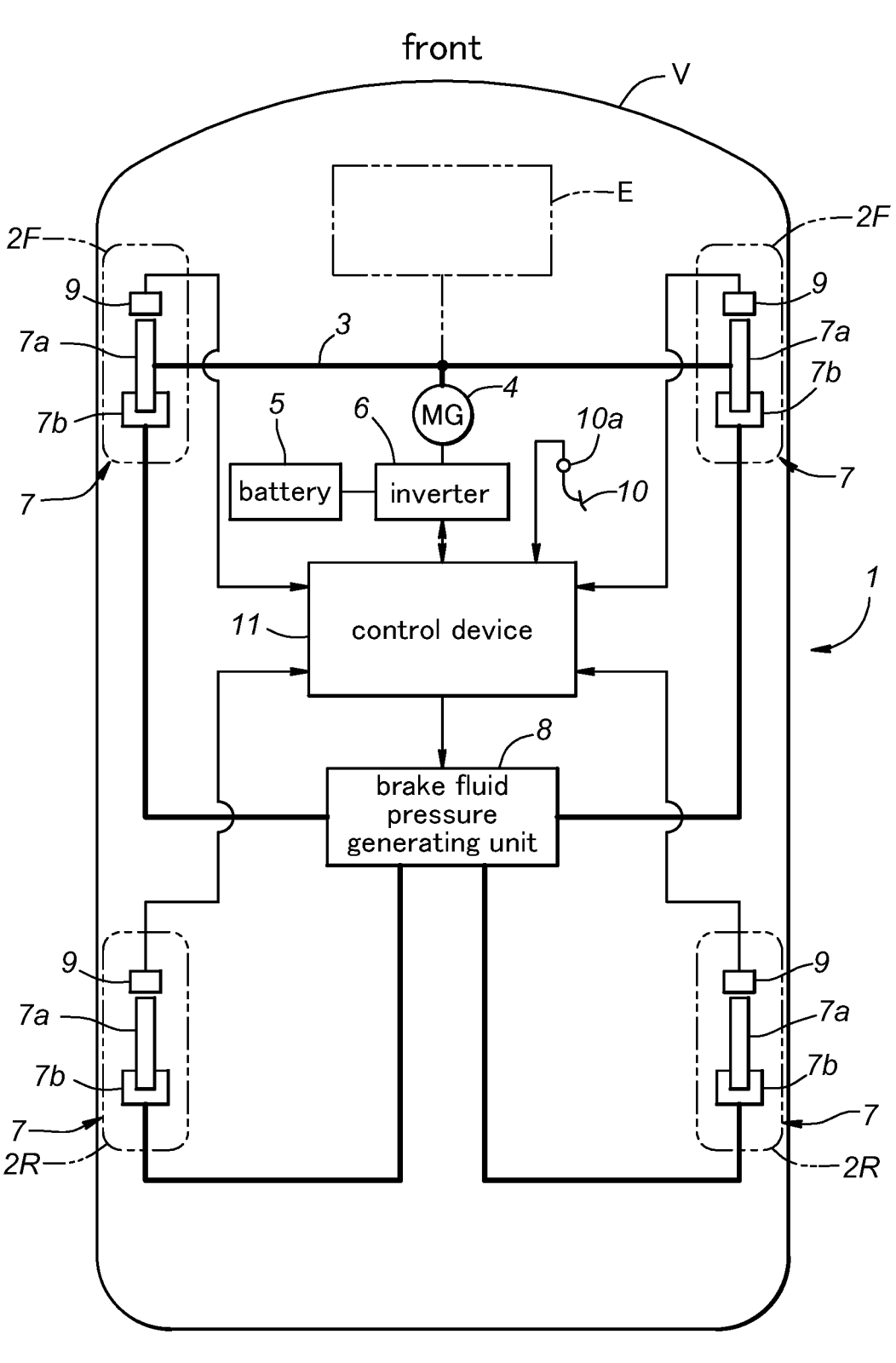
FIG. 1 is a schematic configuration diagram of a vehicle brake system according to the first embodiment.

A first embodiment of the present invention will be described with reference to FIGS. 1 to 6. FIG. 1 is a schematic configuration diagram of an electric or hybrid vehicle (hereinafter, simply referred to as the vehicle V) incorporated with a brake system 1 according to an embodiment of the present invention. The vehicle V includes a pair of left and right front wheels 2F located on the front side thereof and a pair of left and right rear wheels 2R located on the rear side thereof. The left and right front wheels 2F are connected to a front axle 3 which in turn is mechanically connected to a motor/generator 4 in a torque transmitting relationship via a differential gear device (not shown in the drawings). In the illustrated embodiment, the vehicle V consists of a front drive vehicle, but the present invention is equally applicable to a rear drive vehicle or a four wheel drive vehicle by using a motor/generator for driving the rear wheels 2R.

The motor/generator 4 operates both as an electric motor for propelling the vehicle and a generator for providing a regenerative braking. More specifically, under control of a later-described control device 11, the motor/generator 4 can receive electric power from a rechargeable battery 5 serving as a power source via an inverter 6, and can also supply electric power to the battery 5 to recharge it via the inverter 6. At the time of deceleration of the vehicle, the motor/generator 4 serves as a regenerative braking means which converts the deceleration energy into electric power by regenerative braking and generates regenerative brake force.

Each of the front and rear wheels 2F, 2R is provided with a per se known disk brake 7 which serves as a frictional brake for performing frictional braking and includes a disk 7a integrally attached to the wheel 2 (2F, 2R) and a caliper incorporated with a wheel cylinder 7b. The wheel cylinder 7b is connected to a brake fluid pressure generating unit 8 via brake tubing in a per se known manner. The brake fluid pressure generating unit 8 consists of a hydraulic circuit configured to distribute hydraulic brake fluid pressure to the different wheels and adjust the hydraulic brake fluid pressure for each wheel as will be described hereinafter.

A wheel speed sensor 9 is provided in association with each wheel 2 as a wheel speed detection means for detecting the corresponding wheel speed. The vehicle V is provided with a brake pedal 10 serving as a brake operation member used in brake operation by the driver, and the brake pedal 10 is provided with a pedal stroke sensor 10a for detecting an operation amount (depression amount) of the brake pedal 10.

The vehicle V is provided with a control device 11 which performs various controls of the vehicle and functions as a brake force control means. The control device 11 is an electronic control unit (ECU) consisting of a computer provided with a computational processing device (a processor such as a CPU, an MPU, etc.) and a storage device (a memory such as a ROM, a RAM, etc.) and configured to execute various processes. Here, that the control device 11 is configured to execute various processes means that the computational processing device (processor) constituting the control device 11 is programmed to read necessary data and application software from the storage device (memory) and to execute predetermined computational processing according to the software. The control device 11 may consist of one piece of hardware, or may consist of a unit including multiple pieces of hardware.

The control device 11 is electrically connected to the inverter 6, and receives detection signals from the wheel speed sensors 9 and the pedal stroke sensor 10*a*. In the case of an electric vehicle, the structure illustrated in FIG. 1 may be applied as it is, or, alternatively, an additional motor/generator for the rear wheels 2R may be included in the vehicle V. In the case of a hybrid vehicle, the front axle 3 is additionally connected to the output shaft of an engine E (internal combustion engine) indicated by an imaginary line box in FIG. 1.

When an output signal of the pedal stroke sensor 10*a* of the brake pedal 10 increases from an initial value (=0), the control device 11 determines that a command for braking is generated, and performs control of the brake fluid pressure generating unit 8 for braking. As described above, a regenerative cooperative control combining a regenerative braking and a hydraulic braking is performed, and thus, the brake system 1 is configured as a brake-by-wire system.

The brake system 1 of this vehicle V is described in the following with reference to FIG. 2. The brake system 1 constitutes a so-called brake-by-wire system which can control the brake force independently from the driver's operation. Namely, the brake system 1 does not use the fluid pressure generated by a master cylinder 15 (first fluid pressure generating device), to which the operation of the brake pedal 10 is mechanically transmitted, as the brake fluid pressure. The control device 11 detects the operation amount (brake pedal operating amount PS) of the brake pedal 10 by using the pedal stroke sensor 10*a*, and switches oil passages 16 (16*c*, 16*d*) based on the detected value of the brake pedal operating amount PS. Also, the control device 11 actuates an electric servo motor 12 (electric actuator) based on the fluid pressure generated by the master cylinder 15, and thereby controls operation of a motor actuated cylinder (slave cylinder) 13 (second fluid pressure generating device) to make it generate a brake fluid pressure.

The brake pedal 10 is pivotally supported by the vehicle body and undergoes an angular movement according to the braking operation by the driver. One end of a rod 14 for converting the angular movement of the brake pedal 10 into a substantially linear motion is connected to the brake pedal 10, and the other end of the rod 14 engages a first piston 15*a* of the master cylinder 15 of a tandem type to force the first piston 15*a* into the master cylinder 15 according to the braking operation by the driver. The master cylinder 15 additionally receives therein a second piston 15*b* on the side of the first piston 15*a* away from the rod 14 in line with the first piston 15*a*, and the first and second pistons 15*a* and 15*b* are both spring-urged toward the rod 14. The brake pedal 10 is spring-urged and is held at the initial position shown in FIG. 2 by a stopper not shown in the drawings when the brake pedal 10 is not being operated.

The brake system 1 is provided with a reservoir tank 20 connected to the motor actuated cylinder 13 and the master cylinder 15 via oil passages 16*a*, 16*b*, respectively, to replenish the brake fluid to them. Inside the master cylinder 15, a first fluid chamber 17*a* is defined between the first and second pistons 15*a* and 15*b*, and a second fluid chamber 17*b* is defined on the side of the second piston 15*b* facing away from the first piston 15*a*. The first and second fluid chambers 17*a* and 17*b* of the master cylinder 15 are provided with respective atmosphere opening ports 17*c*, 17*d* which are each connected to the reservoir tank 20 via the oil passage 16*b*. The first and second pistons 15*a* and 15*b* of the master cylinder 15 are each fitted with per se known seal members at appropriate positions thereof to seal the first and second fluid chambers 17*a* and 17*b*.

Further, the first and second fluid chambers 17*a* and 17*b* are provided with respective hydraulic pressure supply ports 17*e*, 17*f* which are connected to the disk brakes 7 via oil passages 16*c*. The two hydraulic pressure supply ports 17*e*, 17*f* are never closed by the seal members wherever the first and second pistons 15*a*, 15*b* are, and are always in communication with the first and second fluid chambers 17*a*, 17*b*, respectively. On the other hand, the atmosphere opening ports 17*c*, 17*d* are cut off from the first and second fluid chambers 17*a*, 17*b* by the corresponding first and second pistons 15*a*, 15*b* when the first and second pistons 15*a*, 15*b* are moved from the initial position shown in FIG. 2 and the seal members provided thereon pass the atmosphere opening ports 17*c*, 17*d*.

In addition to the electric servo motor 12, the motor actuated cylinder 13 is provided with a gear mechanism 18 connected to the electric servo motor 12, a screw rod 19, a first piston 21*a*, and a second piston 21*b*. The screw rod 19 is connected to the gear mechanism 18 via a ball screw mechanism for an axial movement. The first piston 21*a* and the second piston 21*b* are provided coaxially with the screw rod 19 and in series with each other. The first piston 21*a* and the second piston 21*b* are spring-urged toward the screw rod 19 by respective return springs. Note that configuration is made such that the first piston 21*a* is able to advance (move toward the second piston 21*b*) independently from the second piston 21*b* to a certain extent, but is able to pull the second piston 21*b* back to the initial position when the first piston 21*a* returns from the advanced position to the initial position shown in FIG. 2.

Inside the motor actuated cylinder 13, a first fluid pressure generating chamber 23*a* is defined between the first and second pistons 21*a* and 21*b*, and a second fluid pressure generating chamber 23*b* is defined on the side of the second piston 21*b* facing away from the first piston 21*a*. The first and second fluid pressure generating chambers 23*a* and 23*b* of the motor actuated cylinder 13 are provided with respective atmosphere opening ports 23*c*, 23*d* which are each connected to the reservoir tank 20 via the oil passage 16*a*. The first and second pistons 21*a* and 21*b* of the motor actuated cylinder 13 are each fitted with per se known seal members at appropriate positions thereof to seal the first and second fluid pressure generating chambers 23*a* and 23*b*.

Further, the first and second fluid pressure generating chambers 23*a* and 23*b* are provided with respective hydraulic pressure supply ports 23*e*, 23*f* which are connected to the disk brakes 7 via oil passages 16*d*. The two hydraulic pressure supply ports 23*e*, 23*f* are never closed by the seal members wherever the first and second pistons 21*a*, 21*b* are, and are always in communication with the first and second fluid pressure generating chambers 23*a*, 23*b* respectively. On the other hand, the atmosphere opening ports 23*c*, 23*d* are cut off from the first and second fluid pressure generating chambers 23*a*, 23*b* by the corresponding first and second pistons 21*a*, 21*b* when the first and second pistons 21*a*, 21*b* are moved from the initial position shown in FIG. 2 and the seal members provided thereon pass the atmosphere opening ports 23*c*, 23*d*. The first fluid chamber 17*a* of the master cylinder 15 and the first fluid pressure generating chamber 23*a* of the motor actuated cylinder 13 are connected to the disk brakes 7 of the rear wheels 2R via a solenoid switching valve 24a which consists of a three-way valve. Also, the second fluid chamber 17b of the master cylinder 15 and the second fluid pressure generating chamber 23b of the motor actuated cylinder 13 are connected to the disk brakes 7 of the front wheels 2F via a solenoid switching valve 24b which consists of a three-way valve.

The connection parts of the switching valves 24a, 24b with oil passages 16c which are connected to the first and second fluid chambers 17a and 17b of the master cylinder 15, respectively, and the connection parts of the switching valves 24a, 24b with oil passages 16d which are connected to the first and second fluid pressure generating chambers 23a and 23b of the motor actuated cylinder 13, respectively, are provided with orifices. The orifices provided in the oil passages 16c connected to the master cylinder 15 are smaller than the orifices provided in the oil passages 16d connected to the motor actuated cylinder 13.

The switching valves 24a, 24b switch the oil passages 16c, 16d so that the corresponding disk brakes 7 are functionally connected to one of the master cylinder 15 and the motor actuated cylinder 13. Specifically, the switching valves 24a, 24b are configured to be selectively placed in a first state shown in FIG. 2 in which they make the disk brakes 7 of the corresponding wheels 2 communicate with the master cylinder 15 via the oil passages 16c and a second state shown in FIG. 3 in which they make the disk brakes 7 of the corresponding wheels 2 communicate with the motor actuated cylinder 13 via the oil passages 16d. Note that the switching valves 24a, 24b are each placed in the first state when not energized.

In the first state, the switching valve 24a makes the wheel cylinders 7b of the disk brakes 7 of the rear wheels 2R communicate with the first fluid chamber 17a of the master cylinder 15, and the switching valve 24b makes the wheel cylinders 7b of the disk brakes 7 of the front wheels 2F communicate with the second fluid chamber 17b of the master cylinder 15. In the first state, each of the switching valves 24a, 24b also functions as a check valve that permits the flow of the liquid from the corresponding one of the first fluid pressure generating chamber 23a or the second fluid pressure generating chamber 23b of the motor actuated cylinder 13 to the wheel cylinders 7b and prevents the opposite flow.

In the second state, the switching valve 24a makes the wheel cylinders 7b of the disk brakes 7 of the rear wheels 2R communicate with the first fluid pressure generating chamber 23a of the motor actuated cylinder 13, and the switching valve 24b makes the wheel cylinders 7b of the disk brakes 7 of the front wheels 2F communicate with the second fluid pressure generating chamber 23b of the motor actuated cylinder 13. In the second state, each of the switching valves 24a, 24b also functions as a check valve that permits the flow of the liquid from the corresponding one of the first fluid chamber 17a or the second fluid chamber 17b of the master cylinder 15 to the wheel cylinders 7b and prevents the opposite flow.

Figure 2:
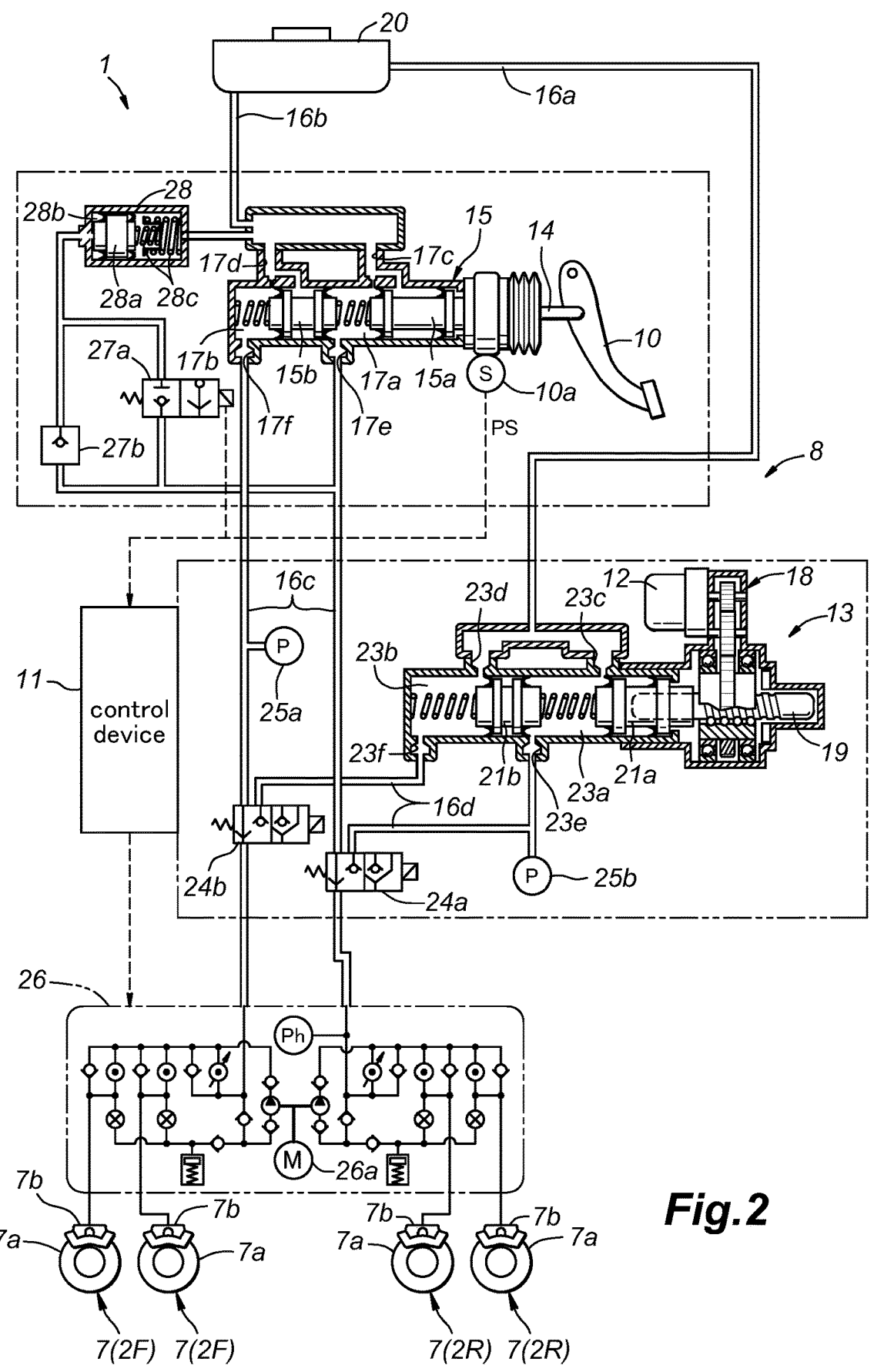
FIG. 2 is a hydraulic circuit diagram of the brake system when switching valves are in a first state.

When the driver operates the brake pedal 10 and the master cylinder 15 generates a fluid pressure while the switching valves 24a, 24b are in the first state shown in FIG. 2, the generated fluid pressure is transmitted to the wheel cylinders 7b so that the disk brakes 7 generate a brake force. When the motor actuated cylinder 13 generates a fluid pressure exceeding the fluid pressure generated by the master cylinder 15, the fluid pressure generated by the motor actuated cylinder 13 is transmitted to the wheel cylinders 7b via the switching valves 24a, 24b, so that the disk brakes 7 generate a larger brake force.

Figure 3:
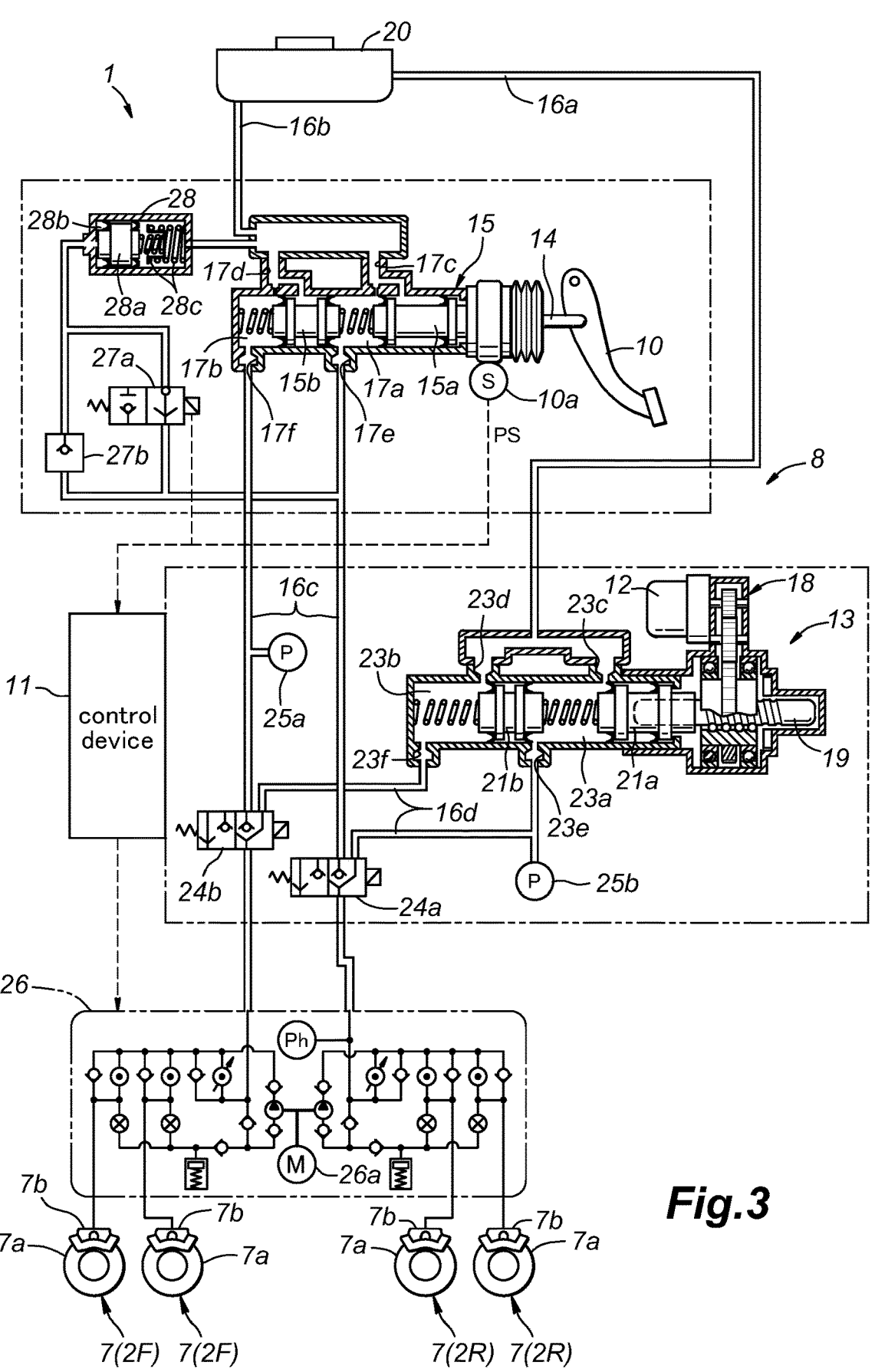
FIG. 3 is a hydraulic circuit diagram of the brake system when switching valves are in a second state.

When the motor actuated cylinder 13 generates a fluid pressure while the switching valves 24a, 24b are in the second state shown in FIG. 3, the generated fluid pressure is transmitted to the wheel cylinders 7b so that the disk brakes 7 generate a brake force. When, upon operation of the brake pedal 10 by the driver, the master cylinder 15 generates a fluid pressure exceeding the fluid pressure generated by the motor actuated cylinder 13, the fluid pressure generated by the master cylinder 15 is transmitted to the wheel cylinders 7b via the switching valves 24a, 24b. As a result, the disk brakes 7 generate a larger brake force.

Between the second fluid chamber 17b and the switching valve 24b, a master cylinder side brake pressure sensor 25a, which is a pressure sensor on the side of the master cylinder 15, is provided to detect the master cylinder side fluid pressure generated by the master cylinder 15. Between the switching valve 24a and the first fluid pressure generating chamber 23a, a motor actuated cylinder side brake pressure sensor 25b, which is a pressure sensor on the side of the motor actuated cylinder 13, is provided to detect the actual brake fluid pressure generated by the motor actuated cylinder 13.

Further, the switching valves 24a, 24b are connected to a plurality (four, in the illustrated example) of wheel cylinders 7b via a VSA system 26. The VSA system 26 may consist of a per se known vehicle behavior stabilization control system configured to control an ABS for preventing the locking of the wheels at the time of braking, a TCS (traction control system) for preventing the slipping of the wheels at the time of acceleration, a yaw moment control unit when cornering, a brake assist system and an automatic brake system for collision prevention in a coordinated manner. For details of such systems, reference should be made to various prior patent publications on such subject matters. The VSA system 26 includes a first system hydraulic circuit for controlling the wheel cylinders 7b of the front wheels 2F and a second system hydraulic circuit for controlling the wheel cylinders 7b of the rear wheels 2R. The VSA system 26 includes a hydraulic motor 26a serving as a fluid pressure generating device for generating the hydraulic pressure to be supplied to each hydraulic circuit, and an operation thereof is controlled by the control device 11.

A cylinder type simulator 28 is connected to the line between the first fluid chamber 17a and the switching valve 24a via a solenoid cutoff valve 27a and a check valve 27b. The simulator 28 is provided with a cylinder having an interior separated by a piston 28a. A fluid receiving chamber 28b is defined on the side of the piston 28a facing the cutoff valve 27a, and a compression coil spring 28c is received on the side of the piston 28a facing away from the fluid receiving chamber 28b. The chamber in which the compression coil spring 28c is provided is in communication with the reservoir tank 20 via the master cylinder 15 and the oil passage 16b.

The cutoff valve 27a is configured to be capable of being selectively placed in a first state shown in FIG. 2 in which the cutoff valve 27a cuts off the fluid receiving chamber 28b from the first fluid chamber 17a and a second state shown in FIG. 3 in which the cutoff valve 27a functions as a check valve. In the second state, the cutoff valve 27a permits the flow of the liquid from the first fluid chamber 17a to the fluid receiving chamber 28b and prevents the opposite flow. Note that the cutoff valve 27a is placed in the first state when not energized. The check valve 27b is a check valve that permits the flow of the liquid from the fluid receiving chamber 28b to the first fluid chamber 17a and prevents the opposite flow.

When the driver depresses the brake pedal 10 while the switching valves 24a, 24b and the cutoff valve 27a are in the second state shown in FIG. 3, the brake fluid in the first fluid chamber 17a flows into the fluid receiving chamber 28b and the biasing force of the compression coil spring 28c is transmitted to the brake pedal 10. Thereby, the vehicle operator is caused to experience a brake pedal reaction from the brake pedal 10 in a similar manner as in the case with the conventional brake system in which the master cylinder and the wheel cylinder are directly connected to each other.

The overall control of the brake fluid pressure generating unit 8 is performed by the control device 11. The control device 11 receives various detection signals from the pedal stroke sensor 10a, the brake pressure sensors 25a, 25b and other sensors (not shown in the drawings) for detecting the behavior of the vehicle. Based on the detection signal from the pedal stroke sensor 10a and the detection signals from the various other sensors, the control device 11 controls the brake fluid pressure generated by the motor actuated cylinder 13 and hence the frictional brake force generated by each of the disk brakes 7. In the case of a hybrid vehicle (or electric vehicle) as is the case with the illustrated embodiment, as the motor/generator 4 provides a regenerative braking, the control device 11 is configured to control the brake force allocation or control the brake fluid pressure produced by the motor actuated cylinder 13 depending on the extent or magnitude of the regenerative braking.

Further, the control device 11 is configured to perform automatic driving control of level 2 or higher. Specifically, based on the input from the driver, the control device 11 executes the vehicle control in the front-rear direction (driving and braking control) and the vehicle control in the left-right direction (steering control) under specific conditions. During the execution of the automatic driving control, the control device 11 executes automatic brake control in which the fluid pressure is supplied to the disk brakes 7 regardless of the brake operation by the driver. During the execution of the automatic brake control, the control device 11 places the both switching valves 24a, 24b in the second state shown in FIG. 3 and actuates the motor actuated cylinder 13 to generate the brake force.

Figure 4:
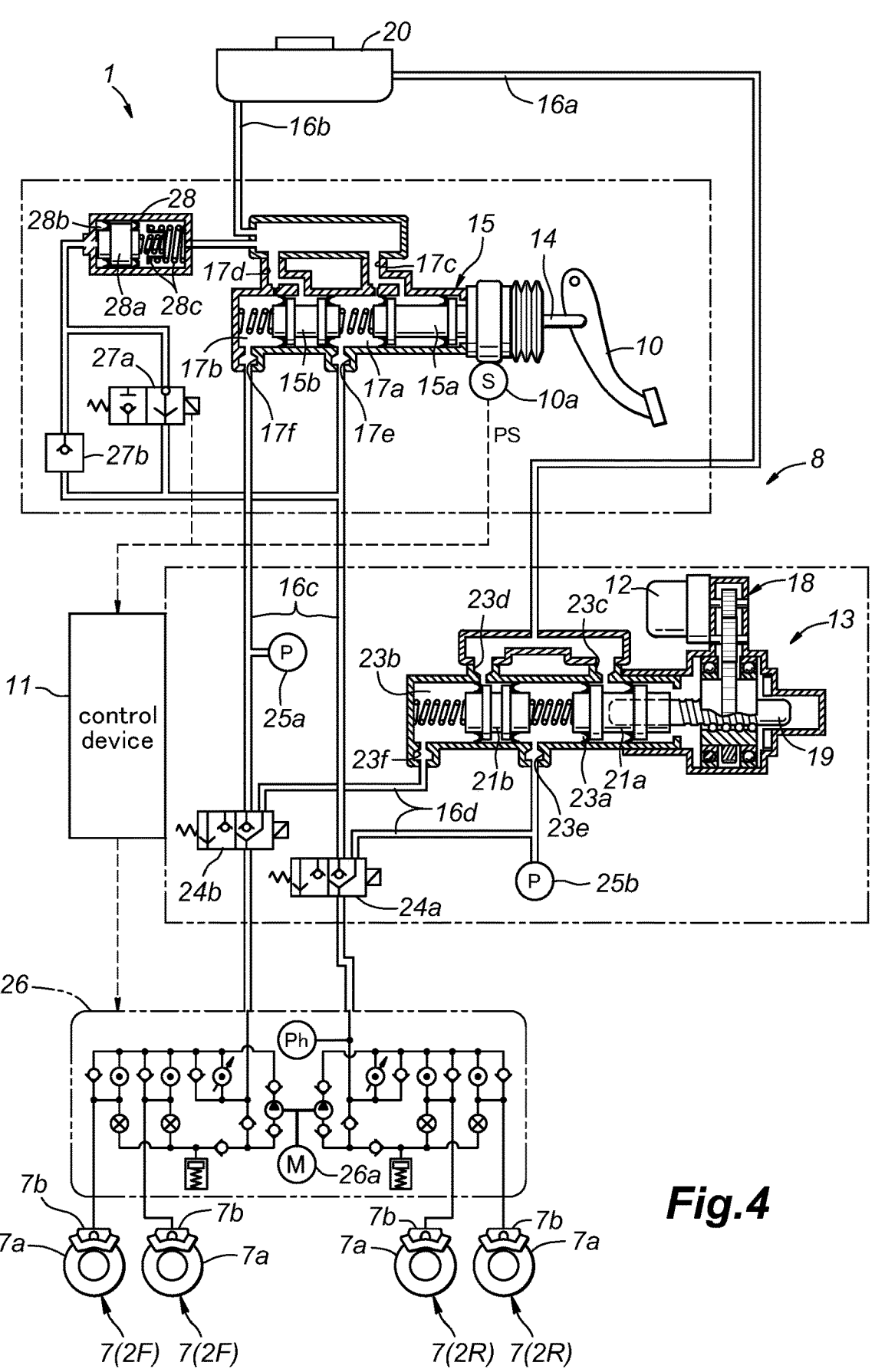
FIG. 4 is a hydraulic circuit diagram of the brake system when atmosphere opening ports are closed.

Specifically, as shown in FIG. 4, the control device 11 actuates the electric servo motor 12 to cause the first and second pistons 21a and 21b of the motor actuated cylinder 13 to be pushed into the cylinder. When the seal members provided on the first and second pistons 21a, 21b pass the atmosphere opening ports 23c, 23d and thereby the atmosphere opening ports 23c, 23d are closed by the first and second pistons 21a, 21b, a hydraulic pressure is generated in the first and second fluid pressure generating chambers 23a, 23b. The hydraulic pressure generated by the motor actuated cylinder 13 is supplied from the hydraulic pressure supply ports 23e, 23f (fluid pressure supply port) to the wheel cylinders 7b of the disk brakes 7 via the oil passages 16d. Thereby, each wheel 2 generates a brake force.

Incidentally, a failure that hinders the execution of the automatic driving control may occur in the vehicle V. When such an abnormality occurs during the manual driving of the vehicle V, the control device 11 terminates the brake-by-wire control using the motor actuated cylinder 13, and prohibits the automatic driving of level 2 or higher thereafter. Specifically, the control device 11 in principle places the both switching valves 24a, 24b as well as the cutoff valve 27a in the first state. On the other hand, when such an abnormality occurs during the automatic driving of the vehicle V, the control device 11 notifies the occurrence of the abnormality to the driver and requests for intervention to the driving (handover request). When the intervention to the driving by the driver is started, the control device 11 in principle places the both switching valves 24a, 24b as well as the cutoff valve 27a in the first state. With the switching valves 24a, 24b placed in the first state, the fluid pressure generated by the master cylinder 15 is directly supplied to the disk brakes 7, and the brake force according to the amount of brake operation by the driver is generated.

On the other hand, even when such an abnormality occurs, the control device 11 continues the vehicle behavior stabilization control performed by the VSA system 26, such as the aforementioned ABS, TCS, yaw moment control, brake assist function, automatic brake function, etc. Namely, the control device 11 permits part of the automatic driving including the vehicle behavior stabilization control after the occurrence of the abnormality.

Figure 5:
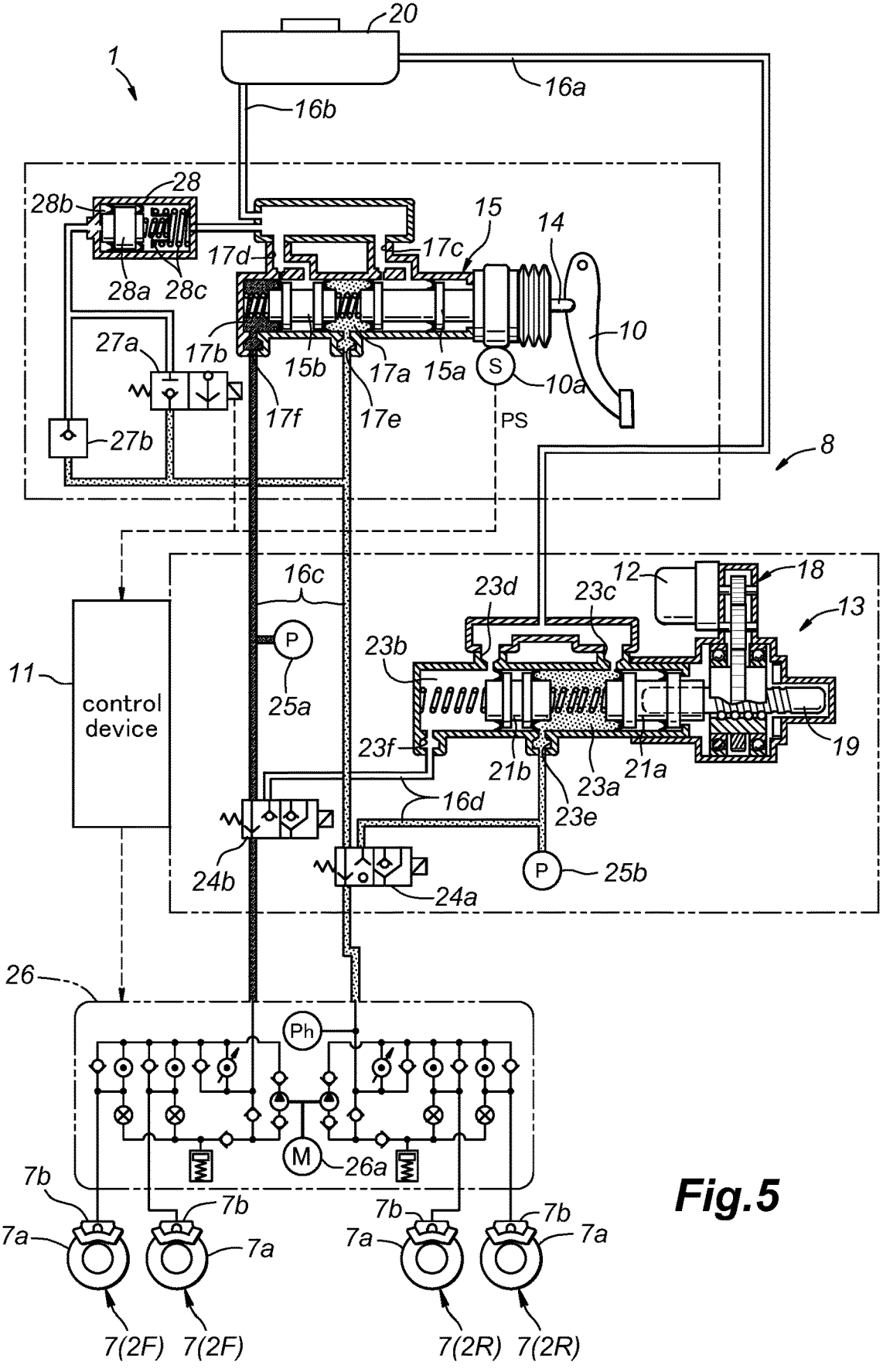
FIG. 5 is a hydraulic circuit diagram of the brake system when a switching valve is in a third state.

Here, of the failures that may hinder the continuation of the automatic driving, there is a failure in which at least one of the switching valves 24a, 24b becomes unable to be actuated in a third state in which at least one of the switching valves 24a, 24b places both of the master cylinder 15 and the motor actuated cylinder 13 in communication with the disk brakes 7 (in a state in which the at least one of the switching valves 24a, 24b is open to both of the oil passages 16c, 16d). FIG. 5 shows a hydraulic circuit of the brake system 1 when the switching valve 24a is in the third state. As shown in FIG. 5, when the motor actuated cylinder 13 is not actuated, the atmosphere opening ports 23c, 23d of the motor actuated cylinder 13 are in communication with the switching valves 24a, 24b, respectively. Therefore, when such a failure occurs, even if the driver performs a brake operation to cause the master cylinder 15 to generate a fluid pressure, the oil flows out to the reservoir tank 20 through the atmosphere opening port 23c. As a result, the hydraulic pressure in the oil passage 16 provided with the switching valve 24a does not increase to a value expected by the driver. Also, when the switching valve 24a becomes the third state due to a failure while the master cylinder 15 is generating a hydraulic pressure, the hydraulic pressure in the oil passage 16 provided with the switching valve 24a is lowered. Thus, the brake system 1 becomes unable to supply a desired hydraulic pressure to the wheel cylinders 7b, and a desired brake force cannot be generated in the corresponding rear wheels 2R.

To solve such a problem, the control device 11 controls the motor actuated cylinder 13 such that the first and second pistons 21a and 21b of the motor actuated cylinder 13 close the atmosphere opening ports 23c, 23d, as will be described in detail later. In other words, when the switching valve 24a has become the third state due to a failure, the atmosphere opening ports 23c, 23d of the motor actuated cylinder 13 which are connected to the reservoir tank 20 are closed by the first and second pistons 21a, 21b. Thereby, the first fluid pressure generating chamber 23a of the motor actuated cylinder 13 is prevented from becoming open to the atmosphere. Therefore, without requiring a cutoff valve as in the prior art, it is possible to generate a brake fluid pressure supplied to the disk brakes 7 in the event of a failure of the switching valve 24a while simplifying the configuration of the brake system 1.

The mode of control operation during a normal braking is described in the following. FIG. 2 shows the state of the system when the both switching valves 24a, 24b are in the first state and the cutoff valve 27a is in the first state (when the driver is not operating the brake pedal 10 during the manual driving). When the driver operates the brake pedal 10 during the manual driving or during the execution of the automatic driving control, the both switching valves 24*a*, 24*b* are placed in the second state and the cutoff valve 27*a* is placed in the second state, as shown in FIG. 3. When the driver does not operate the brake pedal 10, the detection value of the pedal stroke sensor 10*a* is at an initial value (=0), and the control device 11 basically does not produce any brake fluid pressure generation signal.

When the brake pedal 10 is depressed to a certain extent, and the detection value of the pedal stroke sensor 10*a* has become greater than 0, the control device 11 performs the brake-by-wire control. Specifically, the control device 11 places the both switching valves 24*a*, 24*b* in the second state shown in FIG. 3 and prevents the fluid pressure generated by the master cylinder 15 from being transmitted to the motor actuated cylinder 13. In addition, the control device 11 places the cutoff valve 27*a* in the second state shown in FIG. 3 to cause the fluid pressure generated by the master cylinder 15 to be transmitted to the simulator 28. Based on the fluid pressure detected by the master cylinder side brake pressure sensor 25*a*, the control device 11 determines a target brake fluid pressure that takes into account the regenerative braking, and forwards a target current corresponding to the target brake fluid pressure to the electric servo motor 12. This in turn causes the screw rod 19 and hence the first piston 21*a* to be pushed into the cylinder according to the command value, and a brake fluid pressure corresponding to the brake pedal operating amount PS is generated in the first fluid pressure generating chamber 23*a*. At the same time, the second piston 21*b* is displaced forward under the fluid pressure in the first fluid pressure generating chamber 23*a* against the biasing force of the return spring, and the corresponding brake fluid pressure is generated in the second fluid pressure generating chamber 23*b*.

When it is detected that the vehicle operator has displaced the brake pedal 10 in the returning direction (or has released the brake pedal 10), the control device 11 controls the electric servo motor 12 to return the screw rod 19 towards the initial position according to the fluid pressure detected by the master cylinder side brake pressure sensor 25*a*. Thereby, the brake fluid pressure is reduced by an amount corresponding to the operation amount of the brake pedal 10. When the brake pedal 10 is fully returned to the initial position by the return spring not shown in the drawing, the control device 11 places the both switching valves 24*a*, 24*b* in the first state shown in FIG. 2.

When the normal brake control is performed while the VSA system 26 is not activated, the brake fluid pressure generated by the motor actuated cylinder 13 is evenly supplied to the wheel cylinders 7*b* of the front and rear wheels via the VSA system 26. When the VSA system 26 is performing the brake force distributing control, the brake fluid pressure supplied to the wheel cylinder 7*b* of each wheel is adjusted according to the brake force distributing control.

During the execution of the automatic driving control also, the control device 11 places the both switching valves 24*a*, 24*b* and the cutoff valve 27*a* in the second state shown in FIG. 3 and actuates the motor actuated cylinder 13 to generate the frictional brake force necessary for the automatic driving. When the automatic driving control ends, the control device 11 places the both switching valves 24*a*, 24*b* and the cutoff valve 27*a* in the first state.

Next, the mode of braking control in the event of abnormality occurrence is described in the following. FIG. 6 is a flowchart of braking control performed by the control device 11 according to the first embodiment. The control device 11 executes the control routine shown in FIG. 6 repeatedly at a predetermined control interval.

The control device 11 determines whether a predetermined abnormality that hinders the execution of the automatic driving control has occurred in the vehicle V (step ST1). When it is determined that a predetermined abnormality has occurred in the vehicle V (ST1: Yes), the control device 11 places the both switching valves 24*a*, 24*b* in the first state (step ST2), and ends this routine. Thereby, the fluid pressure generated by the master cylinder 15 is directly supplied to the disk brakes 7 and the brake force according to the amount of brake operation by the driver is generated.

When it is determined in step ST1 that a predetermined abnormality has not occurred in the vehicle V (No), the control device 11 determines whether there is a brake operation by the driver, namely, whether the detection value of the pedal stroke sensor 10*a* is greater than 0 (step ST3). When there is no brake operation by the driver (ST3: No), the control device 11 ends this routine after executing the process of step ST2. On the other hand, when it is determined that there is a brake operation by the driver (ST3: Yes), the control device 11 places the both switching valves 24*a*, 24*b* in the second state shown in FIG. 3 and actuates the motor actuated cylinder 13 according to the amount of brake operation by the driver (step ST4). Therefore, the fluid pressure generated by the motor actuated cylinder 13 is supplied to the disk brakes 7, and a desired brake force is generated in each wheel 2 according to the amount of brake operation by the driver.

Thereafter, the control device 11 determines whether at least one of the switching valves 24*a*, 24*b* is in the third state (in the state of failure in which the switching valve makes both of the master cylinder 15 and the motor actuated cylinder 13 communicate with the disk brakes 7) (step ST5). Specifically, the control device 11 compares the stroke amounts of the first and second pistons 21*a*, 21*b* of the motor actuated cylinder 13 with the detection values of the brake pressure sensors 25*a*, 25*b*. When the stroke amount of the first piston 21*a* and the detection value of the brake pressure sensor 25*b* on the side of the motor actuated cylinder 13 are in a predetermined relationship, the control device 11 determines that the switching valve 24*a* is in the second state. On the other hand, if these values are not in the predetermined relationship (when the predetermined relationship which is set beforehand does not hold), the control device 11 determines that the switching valve 24*a* is in the third state. Also, when the stroke amount of the second piston 21*b* and the detection value of the brake pressure sensor 25*a* on the side of the master cylinder 15 are in a predetermined relationship, the control device 11 determines that the switching valve 24*b* is in the second state. On the other hand, when these values are not in the predetermined relationship (when the predetermined relationship which is set beforehand does not hold), the control device 11 determines that the switching valve 24*b* is in the third state.

In this way, the control device 11 determines whether a failure has occurred in at least one of the switching valves 24*a*, 24*b* so that at least one of the switching valves 24*a*, 24*b* has become the third state based on the stroke amounts of the first piston 21*a* and the second piston 21*b* of the motor actuated cylinder 13 and the detection values of the brake pressure sensors 25*a*, 25*b*. Thereby, the control device 11 can quickly perform later-described fail-safe control in the event of a failure of the switching valves 24*a*, 24*b*.

When it is determined in step ST5 that neither of the switching valves 24*a*, 24*b* is in the third state (No), the control device 11 ends this routine without doing anything.

On the other hand, when it is determined in step ST5 that at least one of the switching valves 24a, 24b is in the third state (Yes), the control device 11 immediately stops driving the electric servo motor 12 (step ST6), and ends this routine.

Namely, the control device 11 stops the first and second pistons 21a and 21b of the motor actuated cylinder 13 at the position when it is determined in step ST5 that at least one of the switching valves 24a, 24b has become the third state. The first and second pistons 21a and 21b of the motor actuated cylinder 13 are located in a position closing the atmosphere opening ports 23c, 23d (hereinafter referred to as a closing position). Therefore, the motor actuated cylinder 13 is maintained in a state in which the hydraulic oil does not flow out to the reservoir tank 20 through the atmosphere opening ports 23c, 23d (a state in which the atmosphere opening ports 23c, 23d are closed). Thereby, fail-safe control to prevent the motor actuated cylinder 13 from becoming open to the atmosphere is performed.

As described above, when it is determined in step ST5 that at least one of the switching valves 24a, 24b has become the third state due to a failure (Yes), the control device 11 controls the motor actuated cylinder 13 in step ST6 such that the atmosphere opening ports 23c, 23d are closed by the first and second pistons 21a, 21b. As a result, the first and second fluid pressure generating chambers 23a, 23b of the motor actuated cylinder 13 are prevented from becoming open to the atmosphere. Therefore, it is possible to generate the brake fluid pressure supplied to the disk brakes 7 in the event of a failure of the switching valves 24a, 24b while simplifying the configuration of the brake system 1 by making the conventional cutoff valve unnecessary.

Second Embodiment

A second embodiment of the present invention will be described in the following with reference to FIG. 7. In this embodiment, the procedure of the braking control performed by the control device 11 when abnormality occurs is different from the first embodiment, but the configuration of the brake system 1 is the same as in the first embodiment. Thus, the elements same as or similar to those of the first embodiment will be denoted by the same reference numerals and redundant description may be omitted.

FIG. 7 is a flowchart of braking control performed by the control device 11 according to the second embodiment. The control device 11 executes the control routine shown in FIG. 7 repeatedly at a predetermined control interval. The processes in step ST11 and step ST12 shown in FIG. 7 are the same as the processes in step ST1 and step ST2 in the first embodiment.

After placing the both switching valves 24a, 24b in the first state in step ST12, the control device 11 determines whether at least one of the switching valves 24a, 24b is in the third state (step ST13). The determination of whether at least one of the switching valves 24a, 24b is in the third state may be performed by any method. If it is determined in step ST13 that neither of the switching valves 24a, 24b is in the third state (No), the control device 11 ends this routine without doing anything.

On the other hand, when it is determined in step ST13 that at least one of the switching valves 24a, 24b is in the third state (Yes), the control device 11 actuates the electric servo motor 12 to move the first and second pistons 21a, 21b of the motor actuated cylinder 13 to the closing position where the first and second pistons 21a, 21b close the atmosphere opening ports 23c, 23d (step ST14). With the atmosphere opening ports 23c, 23d closed by the first and second pistons 21a, 21b, the motor actuated cylinder 13 is brought into a state in which the hydraulic pressure generated in or transmitted to the first and second fluid pressure generating chambers 23a, 23b can be maintained.

In this way, when it is determined in step ST13 that at least one of the switching valves 24a, 24b is in the third state (Yes), the control device 11 controls the motor actuated cylinder 13 in step ST14 to move the first and second pistons 21a, 21b to the position where the first and second pistons 21a, 21b close the atmosphere opening ports 23c, 23d. Namely, even if the atmosphere opening ports 23c, 23d of the motor actuated cylinder 13 are in communication with the switching valves 24a, 24b when at least one of the switching valves 24a, 24b becomes the third state due to a failure, the first and second pistons 21a, 21b are displaced to the position where they close the atmosphere opening ports 23c, 23d. Therefore, it is possible to prevent the motor actuated cylinder 13 from becoming open to the atmosphere without need for a conventional cutoff valve, whereby the brake system 1 can be simplified in structure.

Thereafter, the control device 11 determines whether there is a brake operation by the driver, namely, whether the detection value of the pedal stroke sensor 10a is greater than 0 (step ST15). When there is no brake operation by the driver (ST15: No), the control device 11 ends this routine without doing anything. On the other hand, when it is determined that there is a brake operation by the driver (ST15: Yes), the control device 11 activates the VSA system 26, instead of actuating the motor actuated cylinder 13, according to the amount of brake operation by the driver (step ST16). Thereby, the fluid pressure generated by the VSA system 26 is supplied to the disk brake 7, and a desired brake force is generated in each wheel 2 according to the amount of brake operation by the driver.

Note that the hydraulic oil required by the VSA system 26 for fluid pressure generation is supplied from the master cylinder 15, specifically, the hydraulic oil is pushed out from the first and second fluid chambers 17a, 17b due to depression of the brake pedal 10.

As described above, when it is determined in step ST13 that at least one of the switching valves 24a, 24b is in the third state (Yes), the control device 11 activates the VSA system 26 in step ST16 to apply a fluid pressure according to the brake operating amount to the disk brakes 7. Therefore, even when at least one of the switching valves 24a, 24b becomes the third state due to a failure, it is possible to avoid a state in which both of the motor actuated cylinder 13 and the VSA system 26 generate the brake force (double boost). Specifically, it is possible to generate the brake force for each wheel 2 by using the VSA system 26. Therefore, it is possible to ensure safety of the vehicle V due to braking control.

When it is determined in step ST11 that a predetermined abnormality has not occurred in the vehicle V (No), the control device 11 determines whether there is a brake operation by the driver (step ST17). When there is no brake operation by the driver (ST17: No), the control device 11 causes the process to proceed to step ST12. On the other hand, when there is a brake operation by the driver (ST17: Yes), the control device 11 places the both switching valves 24a, 24b in the second state shown in FIG. 3, and actuates the motor actuated cylinder 13 according to the amount of brake operation by the driver (step ST18). Thereby, the fluid pressure generated by the motor actuated cylinder 13 is supplied to the disk brake 7, and a desired brake force is generated in each wheel 2 according to the amount of brake operation by the driver.

Note that, as in the first embodiment, when at least one of the switching valves 24a, 24b becomes the third state due to a failure (ST13: Yes), the control device 11 controls the motor actuated cylinder 13 such that the first and second pistons 21a, 21b close the atmosphere opening ports 23c, 23d (step ST6).

Concrete embodiments of the present invention have been described in the foregoing, but the present invention is not limited to the above embodiment and may be modified or altered in various ways. For example, in the above embodiment, the present invention is applied to an electric or hybrid vehicle as one example, but the present invention may be applied to a vehicle V driven by only the engine E. Also, in the above embodiment, two hydraulic circuits respectively corresponding to the front wheels 2F and the rear wheels 2R are provided and accordingly the brake system 1 is provided with two switching valves 24a, 24b, but a single hydraulic circuit may be provided and accordingly the brake system 1 may be provided with only one switching valve 24a. In the above embodiment, the control device 11 performs a regenerative cooperative control which includes not only a hydraulic braking but also a regenerative braking, but the control device 11 may perform control including only the hydraulic braking without performing the regenerative braking. Further, the concrete structure, arrangement, number, numerical value, etc. of each member or part mode as well as the concrete control described in the above embodiment may be appropriately changed without departing from the scope of the present invention. Also, not all of the components of the brake system 1 shown in the above embodiment are necessarily indispensable and they may be selectively adopted as appropriate.

The invention claimed is:

1. A vehicle brake system, comprising:

a first fluid pressure generating device configured to generate a fluid pressure according to a brake operating amount, which is an amount of operation of a brake operation member by a driver;

a second fluid pressure generating device configured to generate a fluid pressure by moving a piston with an electric actuator;

a frictional brake provided for each wheel and actuated by the fluid pressure;

a switching valve configured to switch fluid passages such that the frictional brake is functionally connected to one of the first fluid pressure generating device and the second fluid pressure generating device; and a control device configured to control the second fluid pressure generating device and the switching valve, wherein the switching valve is configured to be switchable between a first state in which the switching valve makes the first fluid pressure generating device and the frictional brake communicate with each other and prevents a flow of fluid from the frictional brake to the second fluid pressure generating device and a second state in which the switching valve prevents a flow of fluid from the frictional brake to the first fluid pressure generating device and makes the second fluid pressure generating device and the frictional brake communicate with each other, the second fluid pressure generating device has a fluid pressure supply port connected to the switching valve and an atmosphere opening port connected to a reservoir tank, and when, due to a failure, the switching valve is in a third state in which the switching valve makes each of the first fluid pressure generating device and the second fluid pressure generating device communicate with the frictional brake, the control device controls the second fluid pressure generating device to close the atmosphere opening port with the piston.

2. The vehicle brake system according to claim 1, further comprising a pressure sensor disposed in the fluid passage between the switching valve and the first fluid pressure generating device or the second fluid pressure generating device, wherein the control device determines whether the switching valve has been in the third state based on a stroke amount of the piston and a detection value of the pressure sensor, and when it is determined that the switching valve has been in the third state, the control device controls the second fluid pressure generating device to close the atmosphere opening port with the piston.

3. The vehicle brake system according to claim 2, wherein when it is determined that the switching valve has been in the third state, the control device stops the piston at a position when it is determined that the switching valve has been in the third state.

4. The vehicle brake system according to claim 1, wherein when it is determined that the switching valve has become the third state, the control device controls the second fluid pressure generating device to move the piston to a position where the piston closes the atmosphere opening port.

5. The vehicle brake system according to claim 4, further comprising a vehicle behavior stabilizing device provided in the fluid passage between the switching valve and the frictional brake, vehicle behavior stabilizing device being configured to adjust the fluid pressure of a hydraulic fluid supplied from the first fluid pressure generating device or the second fluid pressure generating device and to apply an adjusted fluid pressure to the frictional brake, wherein when the switching valve is placed in the third state, the control device activates the vehicle behavior stabilizing device to apply a fluid pressure according to the brake operating amount to the frictional brake.

* * * * *